൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬൬

3,469,092
MASS INDICATOR FOR MASS SPECTROMETER UTILIZING HALL EFFECT DEVICES

Alfred James Monks, Culcheth, near Warrington, England, assignor to Associated Electrical Industries Limited, London, England, a British company
Filed Jan. 5, 1967, Ser. No. 607,546
Int. Cl. B01d 59/44
U.S. Cl. 250—41.9                                    8 Claims

ABSTRACT OF THE DISCLOSURE

A mass spectrometer mass indicator in which, by means of Hall effect devices, a signal is derived which is proportional to the square of the field strength in the magnetic analyzer of the spectrometer divided by the ion accelerating voltage, this signal being therefore proportional to the ion mass number.

CROSS REFERENCE TO RELATED APPLICATION

Application of Aubrey Edward Banner filed Jan. 5, 1967, Ser. No. 607,412, entitled, Means for Producing Electrical Marker Pulses.

BACKGROUND OF INVENTION

Field of the invention

In a typical mass spectrometer, an ion source liberates ions from a sample to be analyzed and they are electrically propelled under the influence of an accelerating voltage through an exit slit. The ions can be liberated, for example, either with an electron beam or a spark source.

From the exit slit the ions travel in an evacuated path to a suitable collecting and/or detecting device on to which they are focussed. In a so-called single focussing spectrometer, the ion path traverses a magnetic analyzer in which the ions are subjected to and deflected by a transverse magnetic field. In a double focussing spectrometer the ion path traverses an electrostatic analyzer which precedes the magnetic analyzer and subjects the ions to an electrostatic deflection. It is the magnetic analyzer which is of interest in the present instance.

The magnetic analyzer deflects the ions to an extent dependent on their respective mass numbers. For any given accelerating voltage and magnetic field strength in the analyzer, only ions having a specific mass/charge ratio or mass number will pass into the detector. Ions of higher or lower mass numbers will be deflected more or less than the appropriate amount to focus them on to the detector.

In analyzing the mass spectrum of a given sample a technique known as scanning can be used. For one type of scanning, known as magnetic scanning, the field strength in the magnetic analyzer is adjusted over a range of values so that ions derived from the sample and having different mass numbers within a corresponding spectrum range will be brought to focus at the detector at different times during a scan. The detector can therefore measure and record each type of ion present and this information can then be used to identify the types of ions present and the quantities thereof.

As will be explained more fully below, the magnetic deflection of any given ion is a function of its mass number and is directly proportional to the square of the magnetic flux density (field strength) in the magnetic analyzer and inversely proportional to the accelerating voltage if this is not a constant quantity.

To determine the mass number of the ions being collected by the detector at any one time, it is therefore of interest to derive an electrical signal (that is, a current or a voltage) the magnitude of which is proportional, from instant to instant, to the square of the field strength divided, in the case of a non-constant accelerating voltage, by a quantity which varies proportionately with the accelerating voltage. The instantaneous value of this derived signal, hereinafter referred to as a mass indicating signal, therefore represents the mass number (M) of the ions then being received by the detector, in accordance with the relationship $M \alpha B^2/V_A$ where $B$ is the magnetic field strength and $V_A$ is the accelerating voltage.

Description of prior art

United States Patents Nos. 3,103,582 and 3,244,876 disclose circuit arrangements which employ Hall plate devices to derive a mass indicating signal. In each of these arrangements a pair of Hall effect devices, connected electrically in cascade through an amplifier, are arranged between the poles of the magnetic analyzer so as together to be subject to the magnetic field. The first of the two Hall effect devices in the cascade connection thereof is arranged to be fed with a current which is proportional to the reciprocal of the accelerating voltage and which requires a relatively complex circuit for its derivation when, as is required in mass spectrometry, high accuracy is essential. It is an object of the present invention to provide an improved arrangement, susceptible of high accuracy, which also employs Hall effect devices for deriving a mass indicating signal but avoids the need for deriving a current inversely proportional to accelerating voltage.

SUMMARY OF THE INVENTION

A circuit arrangement which is capable of use as a mass indicator includes in accordance with the invention a pair of Hall plate devices of which the first is fed with a constant input current so as to produce an output voltage proportional to the mathematical product of the magnitudes of this current and of a magnetic field to which the first device is subjected. The output voltage is applied to an amplifier of a kind well-known in the art, which produces an output current proportional to its input voltage, and this output current is fed through the second Hall effect device. This second device is also subject to a magnetic field, so that there is obtained from this second device an output voltage which is proportional to the product of the magnetic field strengths to which the two devices are subjected. In using the arrangement as a mass spectrometer mass indicator, both devices are arranged to be subject to the same magnetic field, namely the field of the magnetic analyzer. The output voltage of the second Hall effect device is then proportional to the square of the magnetic analyzer field strength at any instant.

The output voltage of the second Hall effect device can be algebraically combined with the output voltage from a third Hall effect device which is subjected to a magnetic field of magnitude proportional to another variable and is fed with a controlled current which is automatically controlled in accordance with the difference between the two output voltages in such manner as to tend to reduce this difference to zero. As will be shown later, the magnitude of the controlled current at any time is then proportional to the product of the fields to which the first two Hall effect devices are subjected, divided by the said other variable. If therefore the first two devices are subjected to a mass spectrometer magnetic analyzer field and the said other variable is a signal proportional to the ion accelerating voltage, the controlled current will be proportional to the square of the magnetic field strength divided by the accelerating voltage, i.e., to the mass number of the ions received by the detector at a given field strength and accelerating voltage.

Figure 1:
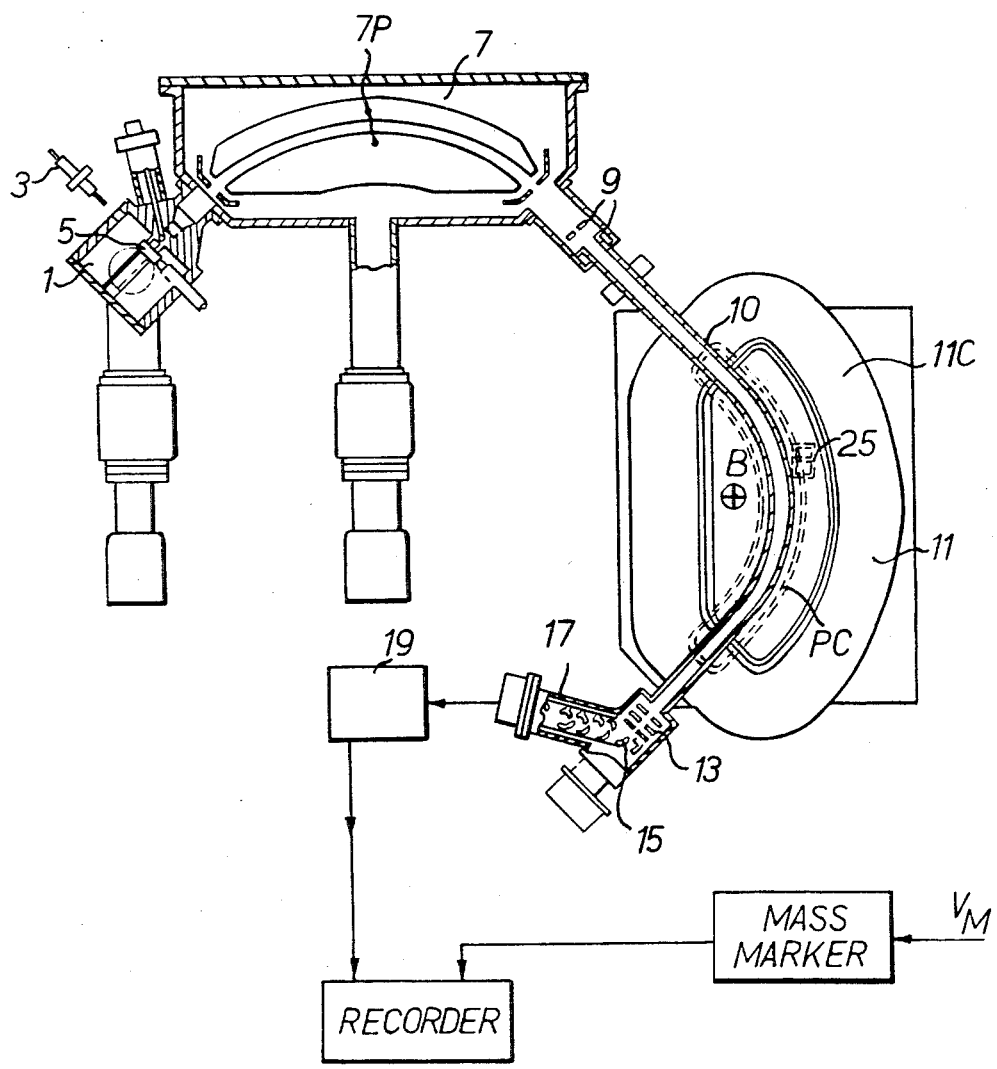
FIG. 1 is a sectional side elevation of a typical mass spectrometer.

The mass spectrometer illustrated in FIG. 1 is of a double-focussing type and includes an ion source chamber 1 into which a specimen carrying probe 3 can be inserted and in which ions can be liberated from that specimen. An electrode 5 to which an accelerating voltage of, say, 8 kilovolts is applied serves to repel these ions as a beam which passes first through an electrostatic analyzer 7 including opposed conductive plates 7P between which a potential difference V is maintained, then through the slit of a monitor collector 9 into a magnetic analyzer 11. In magnetic analyzer 11 an electromagnet coil 11C establishes a strong magnetic field B directed in a direction transverse to the path of the ions, and since the ions are charged particles their paths will be curved in the magnetic field. The deflected ions, or certain of them if different groups of ions are deflected to different degrees, pass through an adjustable slit in a member 13 and are picked up by a collector electrode 15 associated with an electron multiplier 17.

Mass spectrometers as described above are well known in the art, and the output from the electron multiplier 17 is used after amplification in an amplifier 19 to provide a record of the ions passing through the adjustable slit in member 13. The angular deflection of an ion in passing through the magnetic analyzer 11 will depend upon the accelerating voltage, since that determines the speed of the ion, upon the intensity of the magnetic field in the analyzer 11, and upon the mass of the ion. One method of scanning a range of a mass spectrum is to maintain the voltages used in the electrostatic analyzer 7 and on the accelerating electrode 5 constant, and scanning by slowly decreasing the current used in the electromagnet coil 11C of the magnetic analyzer 11. This progressively changes the deflections of all the ions passing through the magnetic analyzer, so that the output from the electron multiplier 17 indicates the number of ions passing through the slitted member 13, and when presented on a cathode ray tube as the vertical deflection with a horizontal scanning speed corresponding to the decay of the magnetic field in the magnetic analyzer 11, the trace shows peaks when ions are present having such a mass number that they are deflected to pass through the slitted member 13.

Mass analysis depends upon the identification of the peaks produced by the specimen during the scanning of the mass spectrum, and it would be advantageous to provide, on the record of the peaks, markers corresponding exactly to known mass/charge ratios, and the apparatus described below provides this facility. Since the charge is almost always unity, the mass/charge ratio will be referred to hereinunder merely as the "mass."

In order to ascertain the number representing the "mass" which is instantaneously being recorded, it is necessary to know accurately the value of B, the magnetic flux density or field to which the ion beam is subjected, and V, the accelerating voltage which determines the velocity of the ions as they pass through that magnetic field. The mass M is given by $$M = \frac{kB^2}{V}$$

where $k$ is a constant for the particular mass spectrometer and can be determined by doing an analysis of a known specimen.

Figure 2:
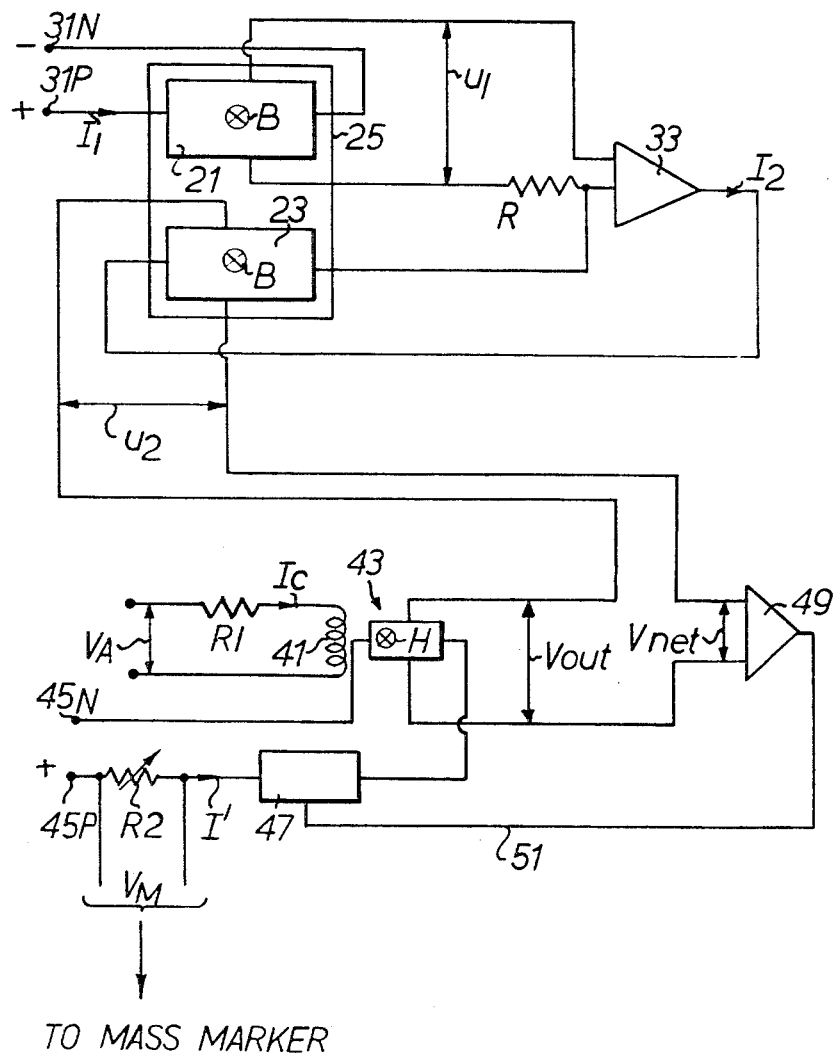
FIG. 2 is a circuit diagram of a circuit arrangement with Hall effect devices embodying the invention and providing an output voltage indicative from instant to instant of the mass number reached during a magnetic scan of the mass spectrum.

In the ancillary equipment illustrated by FIGURE 2, the value of $B^2$ is ascertained by the use of two Hall effect probes 21 and 23 which are placed side by side on a common substrate 25 to ensure that they are at substantially the same temperature. The substrate with the two probes is placed (see FIGURE 1) in the gap of electromagnet 11 so that both probes experience the same value of B (the magnetic field strength) as the ions passing through the analyzer. Each Hall effect probe is in the form of a thin rectangular plate of semi-conductor carrying an electric current in the direction of its length, and since it is subjected to a magnetic field which is normal to the plate, an electro-motive force is developed which is at right angles both to the direction of the current and to the magnetic field.

Referring now to FIGURE 2, a direct current of constant magnitude $I_1$ is caused to flow from a positive pole 31P through the length of the Hall effect probe 21 to the negative pole 31N. The output voltage $u_1$ of probe 21 is thus:

$$u_1 = K_1 I_1 B$$

where $K_1$ is a constant related to the characteristics of the probe 21. One output terminal of probe 21 is connected directly to an input terminal of an amplifier 33, and the other output terminal is connected through a resistor R to the second input terminal of the amplifier. The output current $I_2$ of the amplifier 33 is applied through the length of the Hall effect probe 23 to the second input terminal of the amplifier. Amplifier 33 is of a high gain type having a relatively high input impedance; it gives an output current $I_2$ proportionally related to the input voltage $u_1$ by the expression:

$$I_2 = \frac{u_1}{R}$$

Since the probe 23 is subjected to the magnetic field B and to a lengthwise current of $I_2$, its output voltage $u_2$ is given by:

$$u_2 = K_2 I_2 B$$

where $K_2$ is a constant, so that:

$$u_2 = \frac{K_1 K_2 I_1}{R} B^2$$

Thus so long as $I_1$ is also a constant, $u_2$ is proportional to $B^2$.

If V, the accelerating voltage, is maintained constant during a scan, then $B^2$ and therefore $u_2$ are proportional to mass, in which event $u_2$ could be taken as the input to the mass marker to be described. If V may vary, however, a voltage $V_A$, derived proportionally from it is applied through a resistor R1 to an electro-magnet coil 41 associated with a Hall effect device 43, and produces a magnetic field having a magnitude H in a direction which is normal to the semiconductor plate of this Hall effect device. A current I' is passed lengthwise through the plate of the device 43, flowing from a positive supply pole 45P, through a resistor R2, a current controlling device 47 (e.g., a transistor), and the plate to the negative supply pole 45N. The output voltage $V_{out}$ of the Hall effect device 43 is applied in opposition to the voltage $u_2$ to provide a net voltage $V_{net}$ applied as input to an amplifier 49. The output from this amplifier is applied through a lead 51 as a control signal for the current controlling device 47.

The current $I_C$ flowing in the coil 41 is given by $$I_C = \frac{V_A}{R_1}$$

where $R_1$ is large, and the voltage $V_M$ developed across the resistor $R_2$ by the flow of current I' is given by:

$$V_M = R_2 I'$$

Also, the output voltage $V_{out}$ of the device 43 is given by:

$$V_{out} = \frac{K_M V_A I'}{R_1}$$

where $K_M$ is a constant.

The action of the amplifier 49 is to provide an output signal in lead 51 which will vary current I' in a manner tending to eliminate any difference voltage applied to the amplifier, so that in effect I' is constantly adjusted to make $V_{out}$ equal to $u_2$.

It follows that, since $V_{out} = u_2$:

$$\frac{K_M V_A I'}{R_1} = \frac{K_1 K_2 I_1}{R} B_2$$

whence I' is proportional to $B^2/V_A$ ($I_1$ being constant) so that for a given value of $R_2$, with $V_A$ proportional to V:

$V_M$ is proportional to $B^2/V$

The voltage $V_M$ is therefore proportional to mass.

Referring to FIG. 1, the amplified output from the mass spectrometer is fed to a recorder in which in known manner the collected ions passing through the collector slit 13 during a scan are recorded as a succession of peaks according to their different mass numbers. Associated with the recorder is a mass marker which in known manner, in dependence on an input signal indicative at any instant during a scan of the mass number of the ions then being collected and recorded, supplies the recorder with a mass number identification which is recorded along with the ion record. A novel form of such mass marker is disclosed in the aforementioned related Banner application. In the present case the mass indicative output voltage $V_M$ from the mass indicator circuit of FIG. 2 constitutes the input signal to the mass marker.

From a consideration of the circuit arrangement of FIG. 2 and of the mathematical relationships given for the currents and voltages therein, it will be apparent that if the two Hall effect devices 21 and 23, instead of being subjected to the same magnetic field B, were subjected to separate magnetic fields (say B1 and B2) representing two separate variables, and if $V_A$ represented any third variable, then the output voltage $V_M$ would be proportional to the product of the first two variables divided by the third variable, in accordance with the relationship $$V_M \alpha B1 \times \frac{B2}{V_A}$$

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a mass spectrometer having a magnetic analyzer and a mass indicating circuit arrangement comprising:
   (a) first and second Hall effect devices disposed with said analyzer to be subject to the magnetic field therein,
   (b) means for feeding a constant current through the first of said devices, said first device thereby producing an output voltage proportional to the product of the said field and said current,
   (c) an amplifier of a kind producing an output current proportional to an input voltage thereto,
   (d) connections for applying said output voltage as the input voltage to said amplifier,
   (e) further connections for feeding said output current from the amplifier through said second Hall effect device, this second device thereby producing an output voltage which is proportional to the product of the strength of said field and said output current and therefore to the square of said field strength, and
   (f) circuit means for deriving a signal proportional to the output from said second Hall effect device and inversely proportional to the ion accelerating voltage of the mass spectrometer.

2. The combination of claim 1 wherein said circuit means includes:
   (g) a third Hall effect device,
   (h) means for subjecting said third device to a magnetic field proportional to the ion accelerating voltage of the mass spectrometer,
   (i) means for feeding a controlled current through said third device, said third device thereby producing an output voltage proportional to the product of the field strength to which it is subjected and to said controlled current,
   (j) connections algebraically combining said output voltages from the second and third Hall effect devices,
   (k) means responsive to the difference between the algebraically combined output voltages for controlling said controlled current in a sense tending to reduce such difference to zero, and
   (l) means presenting a mass indication according to the magnitude of said controlled current.

3. The combination according to claim 2, including an amplifier having input connections for applying as an input thereto the difference between said algebraically combined output voltages, and an output connection connected to the current controlling means for controlling the current through said third device according to the output of said amplifier.

4. The combination of claim 2, further including a mass marker and connections for supplying as a mass indicative input thereto an electrical signal proportional to the magnitude of said controlled current.

5. A circuit arrangement for providing an output signal proportional to the product of two variables divided by a third variable, said arrangement comprising
   (a) first and second Hall effect devices subjected to magnetic fields respectively representative of said two variables,
   (b) means for feeding a constant current through the first said device, said device thereby producing an output voltage proportional to the variable represented by the magnetic field to which this first device is subjected,
   (c) an amplifier of a kind producing an output current proportional to an input voltage thereto,
   (d) connections for applying as an input voltage to said amplifier the output voltage from said first device,
   (e) further connections feeding the output current of said amplifier through the second Hall effect device, this device thereby producing an output voltage proportional to the product of said two variables,
   (f) a third Hall effect device subjected to a magnetic field representative of said third variable,
   (g) means for feeding a controlled current through said third device, which device thereby produces an output voltage proportional to the product of said third variable and the controlled current,
   (h) connections algebraically combining the output voltages of said second and third Hall effect devices,
   (i) means responsive to the difference between the algebraically combined voltages for controlling said controlled current in a sense tending to reduce such difference to zero, and
   (j) means for presenting an output signal proportional to the magnitude of said controlled current.

6. In combination, a mass spectrometer having a magnetic analyzer and a mass indicating circuit arrangement comprising:
   (a) first and second Hall effect devices disposed with said analyzer to be subject to the magnetic field therein;
   (b) means for feeding a constant current through the first of said devices, said first device thereby producing an output voltage proportional to the product of the said field and said current;

(c) an amplifier of a kind producing an output current proportional to an input voltage thereto;

(d) connections for applying said output voltage as the input voltage to said amplifier;

(e) further connections for feeding said output current from the amplifier through said second Hall effect device, this second device thereby producing an output voltage which is proportional to the product of the strength of said field and said output current and therefore to the square of said field strength;

(f) a third Hall effect device;

(g) means for subjecting said third device to a magnetic field proportional to the ion accelerating voltage of the mass spectrometer;

(h) means for feeding a controlled current through said third device, said third device thereby producing an output voltage proportional to the product of the field strength to which it is subjected and to said controlled current;

(i) connections algebraically combining said output voltages from the second and third Hall effect devices;

(j) means responsive to the difference between the algebraically combined output voltages for controlling said controlled current in a sense tending to reduce such difference to zero; and (k) means for presenting a mass indication according to the magnitude of said controlled current.

7. The combination according to claim 6, including an amplifier having input connections for applying as an input thereto the difference between said algebraically combined output voltages, and an output connection connected to the current controlling means for controlling the current through said third device according to the output of said amplifier.

8. The combination of claim 6 including a mass marker for presenting mass indication according to the magnitude of said controlled current and connections for supplying as a mass indicative input thereto an electrical signal proportional to the magnitude of said controlled current.

References Cited

UNITED STATES PATENTS 3,244,876  4/1966  Kanda et al.

RALPH G. NILSON, Primary Examiner

S. C. SHEAR, Assistant Examiner